United States Patent
Roeske

[19]

[11] Patent Number: 6,089,270
[45] Date of Patent: Jul. 18, 2000

[54] SLOTTED SLEEVE FOR A ROTARY VALVE

[75] Inventor: Klaus Juergen Roeske, Lugarno, Australia

[73] Assignee: Bishop Steering Pty Limited, North Ryde, Australia

[21] Appl. No.: 09/291,476

[22] Filed: Apr. 14, 1999

Related U.S. Application Data

[62] Division of application No. 09/065,097, Oct. 2, 1998.

[30] Foreign Application Priority Data

Oct. 31, 1995 [AU] Australia .................. PN 6288

[51] Int. Cl.$^7$ .................................................. F15B 9/10
[52] U.S. Cl. ........................... 137/625.22; 91/375 A
[58] Field of Search .................. 91/375 A, 375 R; 137/625.23, 625.22

[56] References Cited

U.S. PATENT DOCUMENTS

| | | |
|---|---|---|
| 3,393,608 | 7/1968 | Saunders . |
| 4,335,749 | 6/1982 | Walter ............................. 137/625.22 |
| 4,428,399 | 1/1984 | Masuda et al. ................ 137/625.22 |
| 4,454,801 | 6/1984 | Spann . |
| 5,131,430 | 7/1992 | Roeske et al. . |
| 5,542,338 | 8/1996 | Rupp ............................. 91/375 R |
| 5,842,538 | 12/1998 | Sangret ......................... 91/375 A X |

OTHER PUBLICATIONS

Patent Abstracts of Japan, JP 07267121 A (Koyo Seiko Co Ltd) Oct. 17, 1995, Abstract.

*Primary Examiner*—John Rivell
*Assistant Examiner*—Meredith H Schoenfeld
*Attorney, Agent, or Firm*—Arent Fox Kintner Plotkin & Kahn, PLLC

[57] ABSTRACT

The method comprises of gripping the component in a gripper of a work holding device mounted to a work holding spindle indexable about a first axis. Then cutting each slot of the array of slots in the bore by a series of cutting strokes of a cutting tool, with the tool mounted to a cutting spindle rotatable about a second axis substantially at right angles to and offset from the first axis. The cutting of each slot followed by indexation of the work holding spindle. During the cutting of at least one of the slots, relative movement between the component and second axis takes place due to movement of the component along the first axis or movement of the second axis in a direction substantially parallel to the first axis or both. The series of cutting strokes comprises two or more successions of progressively deeper cuts and the relative movement occurs between consecutive successions.

6 Claims, 5 Drawing Sheets

SLOTTED SLEEVE FOR A ROTARY VALVE

CROSS REFERENCE TO RELATED APPLICATIONS

This application is a divisional of U.S. patent application Ser. No. 09/065,097, filed Oct. 2, 1998. The subject matter of application Ser. No. 09/065,097 is hereby incorporated by reference.

TECHNICAL FIELD

This invention relates to a method and apparatus for manufacturing a plurality of parallel, longitudinally extending slots in the bore of a component. One example of such a component is the sleeve element of an automotive power steering rotary valve. More particularly the invention is directed towards the manufacture of sleeve elements having varied slot configurations.

BACKGROUND ART

The prior art which is most closely related to that of the present invention is that covered by U.S. Pat. No. 5,328,309 (Bishop et al), U.S. Pat. No. 5,292,214 (Bishop et al), U.S. Pat. No. 5,390,408 (Bishop et al) and U.S. Pat. No. 5,131,430 (Roeske). The first three of these prior art references relate to "slotting machines" which machine the slots in the bore of power steering valve sleeves. The design of these machines calls for each of the slots to be scooped out of the bore of a turned blank by a finger-like cutting tool mounted in a cutting spindle which angularly reciprocates about an axis in a series of progressively deeper cutting and return strokes so forming a closed chamber, or hydraulic port, which is arcuate in longitudinal section. The sleeve is held in a work holding collet, in turn mounted in a work holding spindle, having a rotational axis perpendicular to and offset with respect to the cutting spindle axis. By accurately indexing the work holding spindle upon completion of each slot, the required number of slots are precisely machined in the sleeve, usually 4, 6 or 8 slots for most automotive applications. The slots formed by such machines are arcuate in shape and typically blind-ended.

U.S. Pat. No. 5,131,430 (Roeske) relates to sleeves having a plurality of slots, where some of the slots extend to the axial extremity of the sleeve and are formed to provide hydraulic fluid return paths to the return cavity at one axial extent of the sleeve, and hence to the return port of the power steering valve. In these sleeves such "return" slots are necessarily axially longer in extent and axially displaced with respect to the "inlet" slots, the latter being fully-blind-ended. The slots can be manufactured in a number of ways, the first of which disclosed in the above referenced U.S. Pat. No. 5,292,214 (Bishop et al), is by journalling the workholding spindle of a slotting machine for both sliding and rotation. By varying the axial position of the work holding spindle between two predetermined positions and varying the maximum infeed depth of the cutting tool between two predetermined depths, and by mechanically synchronising these two motions with the rotational index position of the work holding spindle, a sleeve incorporating return slots of the type described can be manufactured. This is achieved by firstly say, machining an inlet slot, then indexing and axially shifting the sleeve such that an axially displaced return slot can be machined. The sleeve is then indexed and axially shifted once again, so that a further inlet slot can be machined. The indexing and axially shifting takes place after each machining operation until the full array of slots have been machined.

Another way of producing the slotted sleeves as disclosed in U.S. Pat. No. 5,131,430, is to double process the sleeves through two prior art slotting machines. For an eight slot sleeve for example, a first slotting machine could slot the four return slots and a second machine the four axially shorter inlet slots.

In many conventional rotary valves a leakage cavity exists at one axial extremity of the sleeve in the housing in order to accommodate leakage oil which inevitably leaks out the input shaft/sleeve journal area and the sleeve/housing interface. This leakage cavity must be communicated to the return port to avoid pressure build up. In many rotary valves this communication is via a breather hole in the input-shaft. Such a "breather hole" arrangement is shown but not referenced on the input shaft shown in FIGS. 1 and 2 of U.S. Pat. No. 5,233,906 (Bishop et al).

In some instances sleeves are arranged such that the return slots are deep and run the axial length of the sleeve to provide communication between the leakage and return cavities. One example of a rotary valve with such a return slot configuration is disclosed in U.S. Pat. No. 4,335,749 (Walter). In this arrangement the three return slots which run the axial length of the sleeve are broached into the sleeve, whilst the remaining slots are slotted utilising a prior art slotting machine. A disadvantage of a broaching operation is that it results in less accurate machining tolerances for metering edges on the broached slots. It is well understood in the art of power steering that accurately positioned metering edges on the slots produce better control of hydraulic and noise characteristics of the valve, and that less accurate machining tolerances such as produced by broaching are not desirable. A further disadvantage of the sleeve of U.S. Pat. No. 4,335,749 is that it must be slotted in two separate machine operations.

It is therefore a problem with the prior art that broached return slots machined the axial length of the sleeve cannot be produced with the same metering edge accuracy and efficiency as can slots machined by slotting machines.

SUMMARY OF INVENTION

In a first aspect the present invention is a method for machining an angularly disposed array of parallel longitudinally extending slots in a bore of a component, the method comprising the steps of:

gripping said component in a gripping means of a workholding device mounted to a workholding spindle indexable about a first axis;

cutting each slot of said array of slots in said bore by a series of cutting strokes of a cutting tool, said tool mounted to a cutting spindle rotatable about a second axis substantially at right angles to and offset from said first axis;

the cutting of each slot followed by indexation of said workholding spindle;

characterised in that during the cutting of at least one of said slots, relative movement between the component and second axis takes place due to movement of the component along the first axis or movement of the second axis in a direction substantially parallel to said first axis or both.

In a first embodiment of the first aspect of the present invention it is preferred that said series of cutting strokes comprises two or more successions of progressively deeper cuts and said relative movement occurs between consecutive successions In a second embodiment of the first aspect of the present invention it is preferred that during cutting of at least one of said slots, a single succession of progressively deeper cuts of the cutting tool takes place followed by said translation of said work holding spindle with respect to the cutting spindle when said cutting tool has reached its maximum depth of cut.

It is preferred that said relative movement of the component and the second axis causes said at least one slot to extend to one or both axial extremities of the component bore.

It is preferred that the component is a sleeve for an automotive power steering rotary valve.

In a second aspect the present invention is a machine for machining slots longitudinally disposed within the bore of a sleeve, comprising a work holding spindle indexable about a rotational axis, said work holding spindle incorporating a work holding device for holding said sleeve, a cutting tool mounted on a cutting spindle, the axis of said cutting spindle being offset from and substantially at right angles to the rotational axis of said work holding spindle, means of supporting said cutting spindle for angular reciprocation, infeed means to permit said cutting tool to execute a succession of progressively deeper cuts in relation to said bore of said sleeve, whereby after a series of indexations of said work holding spindle said slots are machined in the sleeve, characterised in that said machine further comprises sliding means permitting relative translation of said work holding spindle with respect to the axis of said cutting spindle in a direction substantially parallel to the axis of said work holding spindle during machining of at least one of said slots of the sleeve.

In a first embodiment of the second aspect of the present invention it is preferred that during machining of at least one of said slots, two or more successions of progressively deeper cuts of the cutting tool takes place each at a different axial position of said work holding spindle with respect to said axis of said cutting spindle.

In a second embodiment of the second aspect of the present invention it is preferred that during machining of at least one of said slots, a single succession of progressively deeper cuts of the cutting tool takes place followed by said relative movement when said infeed means has caused said cutting tool to reach its maximum depth of cut.

It is preferred that said translation of the work holding spindle with respect to the axis of the cutting spindle causes said at least one slot to extend to one or both axial extremities of the sleeve bore.

It is preferred that said relative translation of the work holding spindle with respect to the axis of the cutting spindle is substantial movement by said work holding spindle whilst said axis of the cutting spindle is held stationary or undergoes minimal movement along a path parallel to the axis of the work holding spindle.

In a third aspect the present invention is a one piece sleeve for a rotary valve, the sleeve comprising an array of inlet and return slots formed in the bore of the sleeve, the inlet slots being stopped short of the axial extremities of the bore, the return slots extending to one extremity of the bore providing an exit area for return oil when the sleeve is installed in the rotary valve, characterised in that at least one said return slot is also extended to the other axial extremity of the sleeve bore providing an entry area for leakage oil when the sleeve is installed in the rotary valve, the entry area provided for leakage oil being substantially smaller than the exit area provided for return oil.

In a first embodiment of the third aspect of the invention it is preferred that the at least one return slot is substantially flat bottomed for a portion of its length.

In a second embodiment of the third aspect of the invention it is preferred that the at least one slot has a region of minimum depth near the axial extremity of the sleeve adjacent the region of leakage oil entry.

In a fourth aspect the present invention is a rotary valve assembly comprising a valve housing and an input-shaft journalled within a sleeve, the sleeve residing in the valve housing and forming return and leakage cavities in the valve housing at opposite axial extremities of the sleeve, the sleeve comprising an array of inlet and return slots formed in the bore of the sleeve, the inlet slots being stopped short of the axial extremities of the bore, the return slots extending to one extremity of the bore adjacent the return cavity and hence providing an exit area for return oil to communicate to the return cavity and hence to a return port in said valve housing, characterised in that at least one return slot also extends to the other axial extremity of the bore adjacent the leakage cavity hence providing an entry area for leakage oil to flow from the leakage cavity to the return cavity through said return slot and thereby minimising pressure build up in the leakage cavity, the entry area for leakage oil being substantially smaller than the exit area for return oil.

In a first embodiment of the fourth aspect of the invention it is preferred that said at least one return slot is substantially flat bottomed for a portion of its length.

In a second embodiment of the fourth aspect of the invention it is preferred that at least one return slot has a region of minimum depth near the extremity of the sleeve adjacent the leakage cavity.

DESCRIPTION

Figure 1:
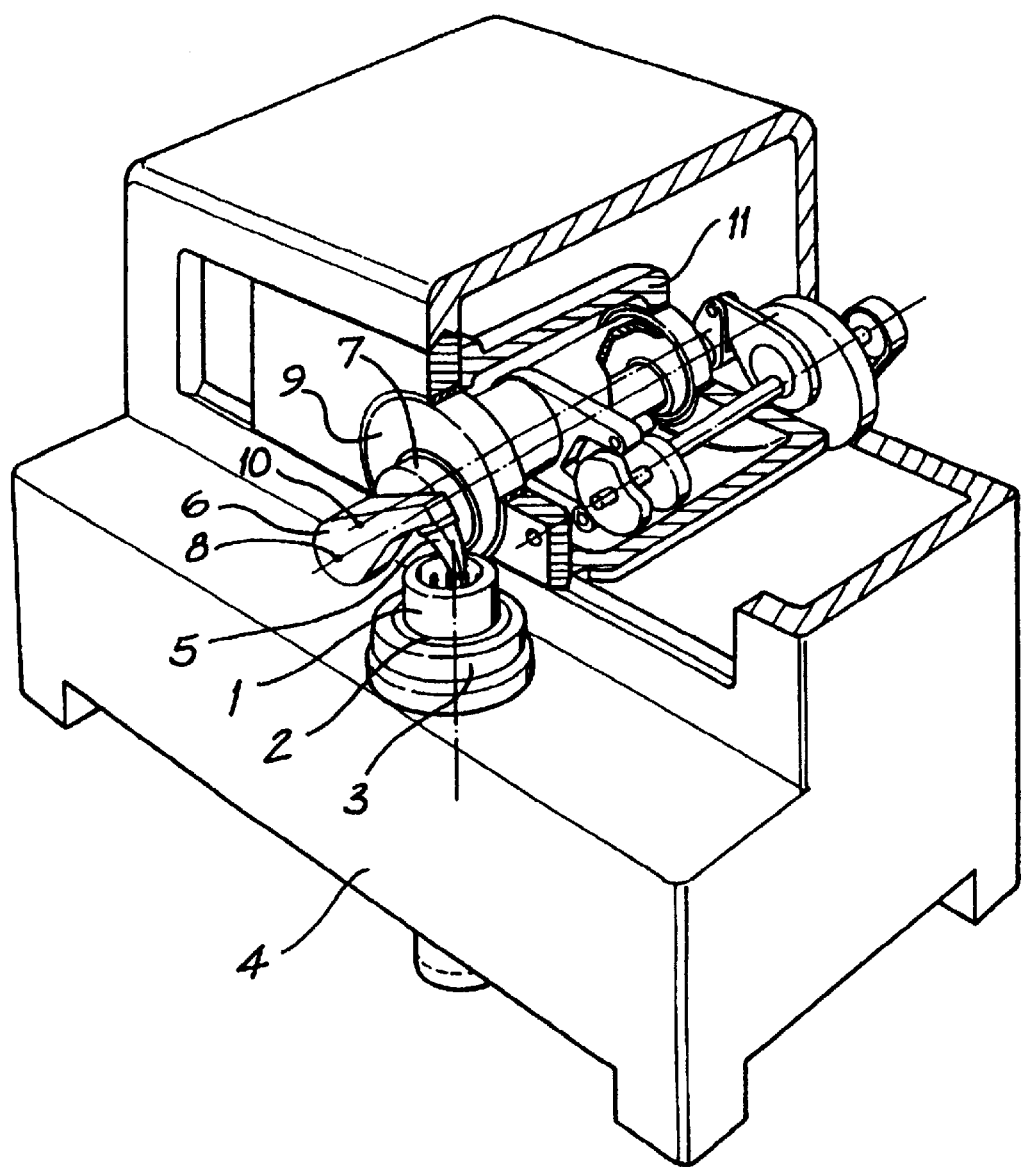
FIG. 1 is a sectioned perspective view of a slotting machine in accordance with one embodiment of the present invention.

FIG. 1 shows a slotting machine which, similar to the prior art, holds sleeve 1 in collet 2 of work holding spindle 3 which is mounted for both rotation and axial sliding in machine base 4. Cutting tool 5 is mounted and secured to an arm 6 extending from cutting spindle 7. Cutting spindle 7 oscillates angularly through an angle of approximately 45 degrees and cutting tool 5 is shown in its uppermost position. Cutting spindle 7 is journalled for rotation about axis 8 within spindle carrier 9 which is itself journalled about axis 10 in cutting capsule 11.

During the cutting operation, oscillation of cutting spindle 7 about axis 8 imparts the arcuate cutting stroke of cutting tool 5, whilst oscillation of spindle carrier 9 imparts the necessary retraction motion at the end of the cutting stroke.

The cam drive arrangement for imparting reciprocating motion to cutting tool 5, which is housed within cutting capsule 11, is not described herein as it is fully covered in U.S. Pat. No. 5,292,214 (Bishop et al). However, an infeed mechanism which permits cutting tool 5 to execute a succession of progressively deeper cuts into sleeve 1 during the slotting operation is later described and shown in FIG. 3.

Figure 2:
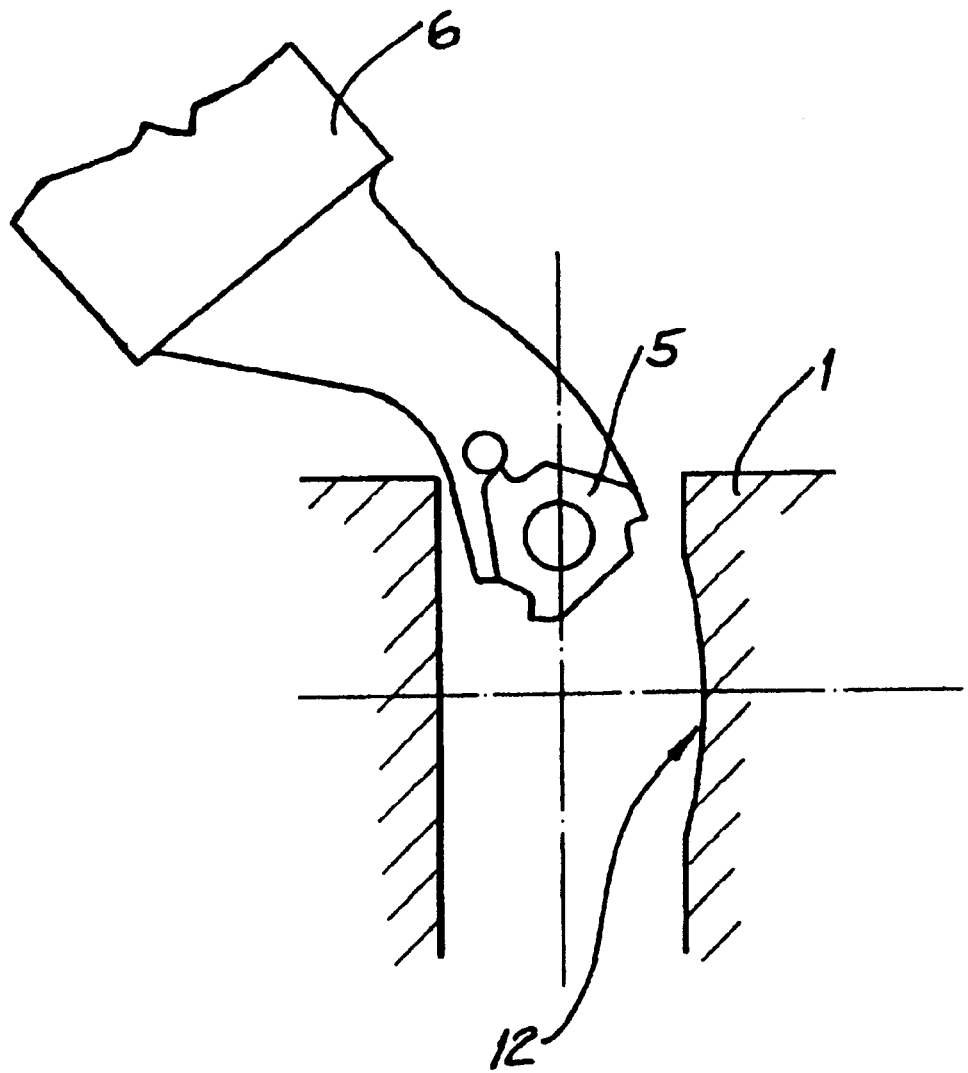
FIG. 2 is a partial vertical cross section of a sleeve with a blind-ended slot in relation to the cutting tool.

FIG. 2 shows sleeve 1 in its relation to cutting tool 5 when cutting a blind-ended arcuate slot 12. For this embodiment of the present invention it is preferred that inlet slots of sleeve 1 are of a blind-ended arcuate configuration similar to slot 12.

Figure 3:
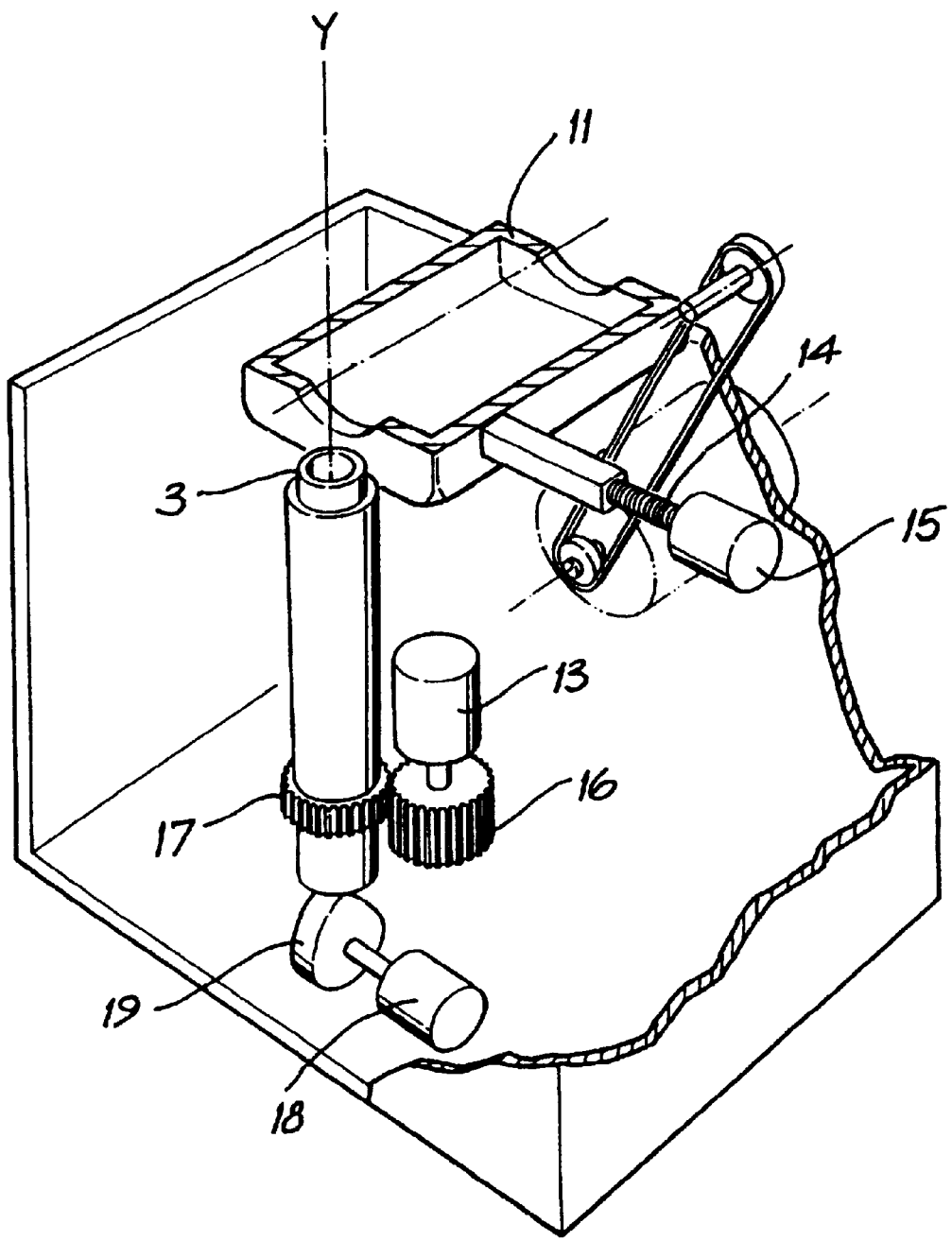
FIG. 3 is a sectioned perspective schematic view of the lower portion of the machine showing main drive components.
Figure 4A:
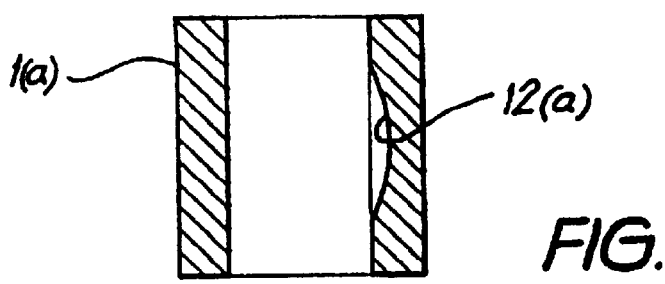
FIGS. 4(a) to 4(e) show five sleeves with five various slot configurations.
Figure 4B:
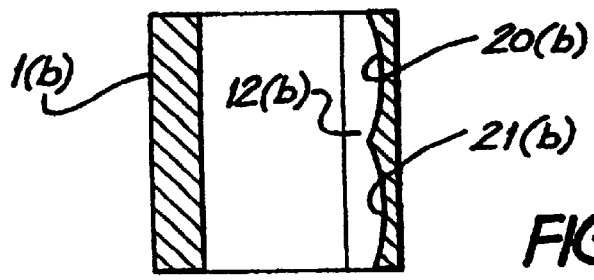
Figure 4C:
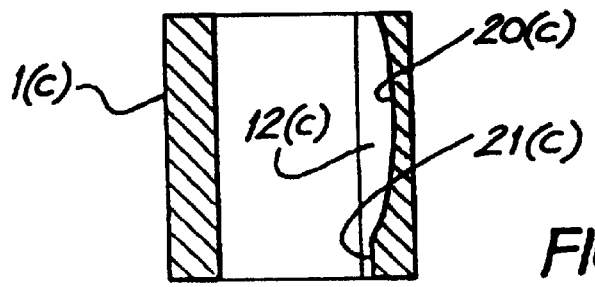
Figure 4D:
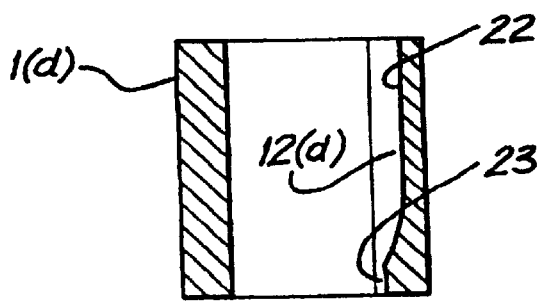
Figure 4E:
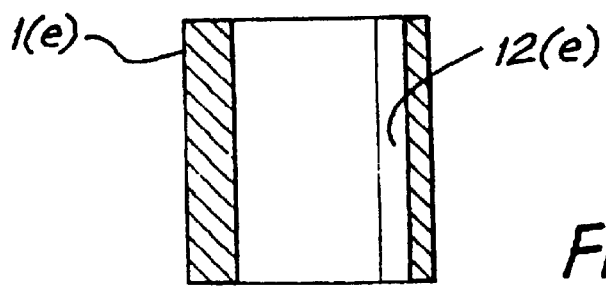

Now referring to FIG. 3, a schematic of a slotting machine mechanism is shown which allows for return slots to be cut along the full axial length of sleeve 1. For reasons of clarity the upper portion of the machine has been removed, and only detail of the infeed mechanism and detail of the mechanism for rotating and axially shifting work holding spindle 3 is shown. Also, for reasons of clarity, various supports, journals, bearings and control units have been omitted from FIG. 3. The infeed mechanism comprises of numerically controlled motor 15 which drives screw feed adjuster 14 mounted on cutting capsule 11. Operation of screw feed adjuster 14 allows for horizontal movement of cutting capsule 11 thereby providing a means for infeeding cutting tool 5 (not shown in FIG. 3) during a cutting operation.

In order to provide indexed rotation of work holding spindle 3, numerically controlled motor 13 is used to drive gear 16 which in turn drives gear 17 mounted on work holding spindle 3. Indexed rotation of work holding spindle 3 allows for sleeve 1 to be rotated so that an array of slots can be machined therein.

In order to provide for axial shift of work holding spindle 3 along axis Y, numerically controlled motor 18 drives a rise and fall cam 19 situated below work holding spindle 3. Cam 19 allows work holding spindle 3, and thereby sleeve 1, to raise and lower along axis Y relative to cutting capsule 11 and cutting tool 5.

Motor 18 and cam 19 can be operated during the operation of cutting tool 5, thereby axially shifting sleeve 1 with respect to axis 8 of cutting spindle 7 resulting in a slot of greater length. When axially shifting of sleeve 1 takes place during cutting, the resultant slot configuration markedly differs from the fully-blind-ended arcuate slot 12 shown in FIG. 2.

Now referring to FIGS. 4 (a) to 4 (e), five different embodiments of slots 12 (a) to 12 (e) are shown in sleeves 1 (a) to 1 (e) respectively. For purposes of clarity outside features of the sleeve have been omitted and the dimensions appropriately altered. Also for ease of reference only one slot is shown in each sleeve. All five slot embodiments can be machined on the slotting machine according to the first embodiment of the second aspect of the present invention.

FIG. 4 (a) depicts sleeve 1 (a) with blind-ended arcuate slot 12 (a). This slot is similar to slot 12 shown in FIG. 2 and may preferably be used as an inlet slot on the sleeve. Slot 12 (a) is cut into sleeve 1 (a) in a conventional manner with work holding spindle 3 held stationary, whilst cutting tool 5 angularly reciprocates in a series of progressively deeper cutting and return strokes.

FIGS. 4 (b) to 4 (e) depict sleeves 1 (b)–1 (e) with slots 12 (b)–12 (e) respectively. All four slots 12 (b)–12 (e) run the axial length of their respective sleeves and are thereby open ended at both axial extremities on each sleeve.

Slots 12 (b) and 12 (c), shown in FIGS. 4 (b) and 4 (c), can both be cut using the machine according to the first embodiment of the second aspect of the present invention. For cutting each of these slots 12 (b) and 12 (c) it is necessary to angularly reciprocate cutting tool 5 in a series of progressively deeper cutting and return strokes at a first axial position whilst work holding spindle 3 is held stationary, thereby producing first arcuate slot portions 20 (b) and 20 (c), respectively. In each case, once cutting of the first arcuate portion 20 (b) or 20 (c) is complete, cutting tool 5 is partially or fully retracted and work holding spindle 3 is axially shifted upwardly along its axis to a second axial position by operation of motor 18 and cam 19. Cutting tool 15 is then once again angularly reciprocated producing second arcuate portions 21 (b) and 21 (c) respectively. Slot 12 (b) on sleeve 1 (b) is shown with first arcuate portion 20 (b) and second arcuate portion 21 (b) cut symmetrically along the sleeve. In contrast, slot 12 (c) of sleeve 1 (c) shows a non-symmetrical embodiment, with first arcuate portion 20 (c) considerably larger in depth and length than the second arcuate portion 21 (c).

Slots 12 (d) and 12 (e), shown in FIGS. 4 (d) and 4 (e), can be cut with cutting taking place at the same time as work holding spindle 3 is axially shifting along its axis Y. Such slots can be cut using the machine according to the second embodiment of the second aspect of the present invention. In order to produce slot 12 (d), cutting tool 5 is angularly reciprocated as work holding spindle 3 is axially shifted upwardly, using cam 19 and motor 18, between a first and second axial position, thus producing a first slot portion 22 which is substantially flat at one end and curved at the other. Cutting tool 5 is then fully or partially retracted such that work holding spindle 3 may again be axially shifted upwardly. Cutting tool 5 is then reciprocated again to produce second slot portion 23, which is substantially smaller in length and depth than first slot portion 22.

In order to produce slot 12 (e), which is substantially flat, it is necessary to axially shift work holding spindle 3 continuously or intermittently upwardly, whilst cutting tool 5 angularly reciprocates continuously or intermittently at a number of axial positions. Where intermittent axial shift of work holding spindle 3 is used, cutting tool 5 may be fully or partially retracted following a cutting operation and prior to an axial shift of work holding spindle 3.

It should be understood that any of the slot embodiments shown in FIGS. 4 (b) through to 4 (e) may be used as return slots which run the axial length of the sleeve.

In use, the slotting machine and method of the present invention may be utilised to machine both inlet slots similar to slot 12 (a) and return slots similar to any of slots 12 (b) to 12 (e) when sleeve 1 is loaded into the work holding spindle 3. This means that the return slots which run the axial length of the sleeve, can be machined in a "slotting" operation using the same cutting tool as the inlet slots, thereby eliminating additional machining processes such as broaching. Width control of the slots, and positional accuracy of the slot edges are therefore maximised.

It should be understood that slots 12 (b) to 12 (e) are only four representative embodiments which may be machined into sleeve 1 as return slots. Variation of the depth of cut of cutting tool 5 and variation of axial shift of work holding spindle 3, allows for many different not shown embodiments of slots which run the axial length of sleeve 1. As such many different other return slots configurations are also achievable.

Figure 5:
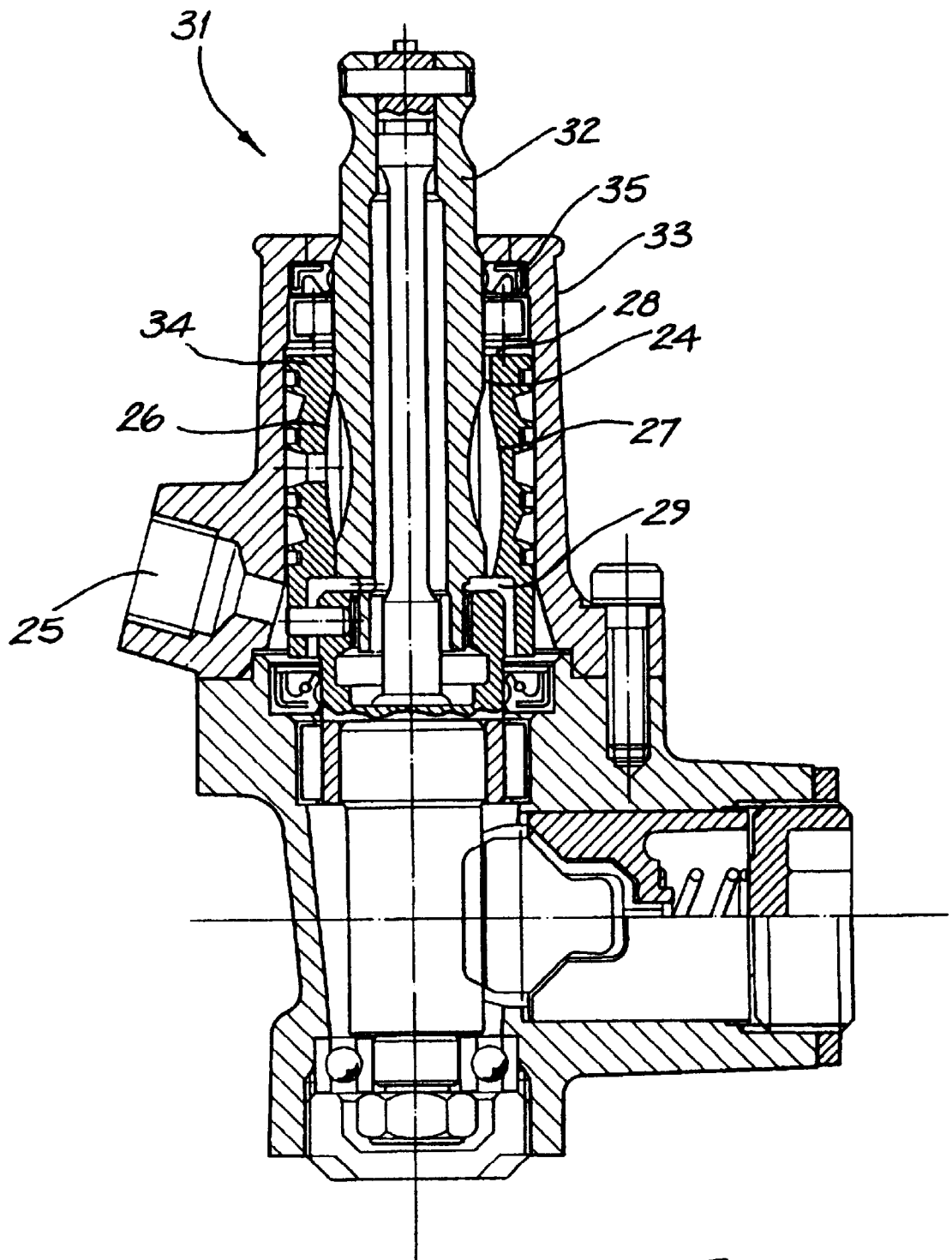
FIG. 5 is a sectional view of a steering gear valve assembly having sleeve with a return slot running the axial length of the sleeve.

Now referring to FIG. 5, a valve 31 is shown contained in housing 33 and comprises input-shaft 32 having sleeve 34 journalled thereon. The manner in which input-shaft 32 and sleeve 34 operate to direct oil to and from a hydraulic pump and assist cylinders (not shown) is well known in the art and will not be described here. For ease of reference an inlet slot 26 of sleeve 34 is shown opposite a return slot 27 of sleeve 34 (in a true valve-cross section of the most common valve configuration, either two inlet slots or two return slots would be seen in this view).

Inlet slot 26 is a blind-ended arcuate slot similar to slot 12 (*a*) shown in FIG. 4 (*a*), whilst return slot 27 has a configuration similar to slot 12 (*c*) in FIG. 4 (*c*). Due to return slot 27 running the axial length of sleeve 34 it connects leakage cavity 28 to return cavity 29 which is fluidly connected to return port 25. Both inlet slot 26 and return slot 27 are machined into sleeve 34 using the method and slotting machine embodiment described earlier.

The configuration of slot 27 is such that it is substantially shallower in region 24 near the axial extremity of sleeve 34 adjacent leakage cavity 28. This configuration is advantageous in that it limits the magnitude of pressure pulsations that occur in leakage cavity 28, as compared to the magnitude of pressure pulsations which occur in leakage cavity 29, due to the damping action of shallower region 24. During situations where large road forces are applied to the steering gear (eg. a front wheel encountering a pot-hole) oil flow through the valve is temporarily arrested and this causes large pressure "spikes" in return cavity 29. Such pressure "spikes", if they were to reach leakage cavity 29, may damage input seal 35.

What is claimed is:

1. A one piece sleeve for a rotary valve, the sleeve comprising an array of inlet and return slots formed in the bore of the sleeve, the inlet slots being stopped short of the axial extremities of the bore, the return slots extending to one extremity of the bore providing an exit area for return oil when the sleeve is installed in the rotary valve, characterised in that at least one said return slot is also extended to the other axial extremity of the sleeve bore providing an entry area for leakage oil when the sleeve is installed in the rotary valve, the entry area provided for leakage oil being substantially smaller than the exit area provided for return oil.

2. A one piece sleeve for a rotary valve as claimed in claim 1, wherein said at least one return slot is substantially flat bottomed for a portion of its length.

3. A one piece sleeve for a rotary valve as claimed in claim 1, wherein said at least one slot has a region of minimum depth near the axial extremity of the sleeve adjacent the region of leakage oil entry.

4. A rotary valve assembly comprising a valve housing and an input-shaft journalled within a sleeve, said sleeve residing in the valve housing and forming return and leakage cavities in said valve housing at opposite axial extremities of said sleeve, said sleeve comprising an array of inlet and return slots formed in the bore of said sleeve, said inlet slots being stopped short of the axial extremities of said bore, said return slots extending to one extremity of said bore adjacent said return cavity and hence providing an exit area for return oil to communicate to said return cavity and hence to a return port in said valve housing, characterised in that at least one return slot also extends to the other axial extremity of said bore adjacent said leakage cavity hence providing an entry area for leakage oil to flow from the leakage cavity to said return cavity through said return slot, and thereby minimising pressure build up in said leakage cavity, the entry area for leakage oil being substantially smaller than said exit area for return oil.

5. A rotary valve assembly as claimed in claim 4, wherein said at least one return slot is substantially flat bottomed for a portion of its length.

6. A rotary valve assembly as claimed in claim 4, wherein said at least one return slot has a region of minimum depth near the extremity of the sleeve adjacent the leakage cavity.

* * * * *